(12) United States Patent
Cantz

(10) Patent No.: US 9,761,352 B2
(45) Date of Patent: Sep. 12, 2017

(54) SEALED CONDUCTOR CABLE

(71) Applicant: HUBER+SUHNER AG, Herisau (CH)

(72) Inventor: Thomas Cantz, Stäfa (CH)

(73) Assignee: Huber+Suhner AG, Herisau (CH)

( * ) Notice: Subject to any disclaimer, the term of this patent is extended or adjusted under 35 U.S.C. 154(b) by 0 days.

(21) Appl. No.: 14/766,319

(22) PCT Filed: Mar. 6, 2014

(86) PCT No.: PCT/EP2014/054306
§ 371 (c)(1),
(2) Date: Aug. 6, 2015

(87) PCT Pub. No.: WO2014/135615
PCT Pub. Date: Sep. 12, 2014

(65) Prior Publication Data
US 2015/0371733 A1 Dec. 24, 2015

(30) Foreign Application Priority Data
Mar. 7, 2013 (CH) .......................... 557/13

(51) Int. Cl.
H01B 7/02 (2006.01)
H01B 7/288 (2006.01)
H01B 7/00 (2006.01)
H01B 1/02 (2006.01)
H01B 3/30 (2006.01)
H01B 5/08 (2006.01)
H01B 13/02 (2006.01)

(52) U.S. Cl.
CPC ............. *H01B 7/288* (2013.01); *H01B 1/023* (2013.01); *H01B 1/026* (2013.01); *H01B 3/30* (2013.01); *H01B 5/08* (2013.01); *H01B 7/0009* (2013.01); *H01B 13/02* (2013.01)

(58) Field of Classification Search
CPC .......... H01B 1/02; H01B 1/023; H01B 1/026; H01B 5/08; H01B 5/10; H01B 5/101; H01B 5/102; H01B 5/104; H01B 5/108; H01B 7/17; H01B 7/18; H01B 7/1825; H01B 7/1875; H01B 7/22; H01B 7/226
USPC .......................... 174/102 R, 106 R, 107, 108
See application file for complete search history.

(56) References Cited

U.S. PATENT DOCUMENTS 3,800,522 A * 4/1974 Hughes .................. D07B 1/162
57/215
4,158,283 A * 6/1979 Nation ..................... D07B 1/06
420/420

(Continued)

FOREIGN PATENT DOCUMENTS

| CN | 101714436 A | 5/2010 |
| CN | 201549246 U | 6/2010 |

(Continued)

Primary Examiner — William H Mayo, III
(74) Attorney, Agent, or Firm — Pauley Erickson & Kottis

(57) ABSTRACT

A stranded conductor (2) including a specific number of a first type of wire (5) which, in cross-section of the stranded conductor, are arranged in a hexagonal pattern around a central wire in at least two layers. The wires arranged at the vertices of the hexagonal pattern are of a second type of wire having in principle a smaller diameter than the first type of wires. The interstitial spaces (10) between the first and the second wires are filled by a sealing agent (3).

17 Claims, 5 Drawing Sheets

(56) References Cited

U.S. PATENT DOCUMENTS

| | | | | |
|---|---|---|---|---|
| 4,266,399 A | * | 5/1981 | Ellis, Jr. | H01B 13/04 |
| | | | | 57/293 |
| 4,471,161 A | * | 9/1984 | Drummond | D07B 3/10 |
| | | | | 174/110 R |
| 4,673,775 A | * | 6/1987 | Nigol | H01B 5/104 |
| | | | | 174/128.1 |
| 4,689,444 A | * | 8/1987 | Burgess | H01B 5/08 |
| | | | | 174/128.1 |
| 5,151,143 A | * | 9/1992 | Downie | H01B 13/322 |
| | | | | 156/48 |
| 5,260,516 A | * | 11/1993 | Blackmore | H01B 5/08 |
| | | | | 174/113 A |
| 5,496,969 A | | 3/1996 | Blackmore | |
| 5,696,352 A | | 12/1997 | Kourimsky | |
| 6,311,394 B1 | * | 11/2001 | White | H01B 5/08 |
| | | | | 29/33 F |

FOREIGN PATENT DOCUMENTS

| | | |
|---|---|---|
| DE | 24 44 360 | 3/1976 |
| JP | 1-302615 | 12/1989 |
| JP | 9-92045 | 4/1997 |
| WO | WO 01/11635 A1 | 2/2001 |

\* cited by examiner

SEALED CONDUCTOR CABLE

CROSS-REFERENCE TO RELATED APPLICATIONS

The present application is a 371 of PCT/EP2014/054306, filed Mar. 6, 2014, which claims priority to Switzerland Patent Application No CH0055713, filed Mar. 7, 2013, the entire content of which is incorporated herein by reference.

BACKGROUND OF THE INVENTION

Field of the Invention

The present invention is directed to a stranded conductor cable.

Discussion of Related Art

DE 2444360 was published on 25 Mar. 1976 on behalf of Siemens AG and describes a longitudinally sealed communication cable. The document shows cables which comprise single or group of wires which are aligned in multiple concentric layers, where wires of the same layer have equal distances to the central axis of the cable. Hence the conducting core of the wire has an essentially round shape. The conducting core is covered by an insulating plastic jacket. A sealing agent is filled in by special means that are located in the gaps between the conducting wires.

U.S. Pat. No. 5,151,143 was published on 29 Sep. 1992 on behalf of Ian Downie and describes a moisture impermeable electric cable. The cable comprises a central wire around which at least one layer of wires is helically wound. The central wire may be a single wire or a stranded wire. All wires that belong to the same layer have essentially the same distance from the central layer. The resulting stranded conducting core is covered by an insulating plastic jacket. The gaps between the conducting wires are filled with a sealing agent by applying a vacuum to one end of the cable while connecting the other end to a reservoir of a liquid filling agent.

U.S. Pat. No. 4,471,161 was published on 11 Sep. 1984 on behalf of the Essex Group Inc. and de-scribes a conductor strand. The unilay cable core comprises a dense hexagonal packing of wires with a central core and two surrounding helically shaped layers. The outermost layer comprises in total twelve wires with circular cross-sections—six wires, which have the same diameter than the wires used for the core and the first layer, and in addition six wires with a diameter that is smaller than the diameter of the other wires. In the outermost layer, the two wire types are arranged alternately in circumferential direction, which causes an almost circular cross-section of the cable core.

U.S. Pat. No. 5,496,969 was published on 5 Mar. 1996 on behalf of Ceeco Machinery Manufacturing Ltd. and shows a concentric compressed unilay stranded conductor. According to the invention, the number of wires in adjacent layers in the stranded conductor are integers that are not divisible by a common number with the exception of the integer one. In combination with radial compression of specific layers of wires, it therefore becomes possible to build a conductor with a stale circular cross-section.

JP 1302615 was published on 6 Dec. 1989 on behalf of Hitachi Cable Ltd. and describes a fully compressed conductor with hexagonal packing. In order to prevent snaking and swelling of cables, which may result from non-uniform compression of the wires, wires with smaller diameters are placed at the vertices of the outermost hexagonally shaped layer of wires.

U.S. Pat. No. 5,696,352 was published on 9 Dec. 1997 on behalf of the Whitaker Corporation and shows a multi-stranded conductor. The strands have serrations around the circumference thereof to inhibit slipping movement (shifts) between adjacent strands, e.g. when used for insulation displacement contacts (IDC).

SUMMARY OF THE INVENTION

One object of the present invention is to provide a conductor cable with a stranded conductor core that has good mechanical flexibility, high dimensional stability of its cross-section and which can be sealed in a longitudinal direction by a minimum amount of a sealing material.

Longitudinally sealed conductor cables are used in wide field of applications where the propagation of fluid and moisture within the cable has to be prevented, e.g. such as in vehicle wiring. A commonly used approach to prevent intrusion of fluids into a cable core and propagation of fluid within a stranded core is to fill the hollow spaces (interstitial spaces) in the core with a filler material. Such fillers usually inhibit mass transfer of the fluids by suppressing diffusion as well as capillary effects in longitudinal direction of the cable. In many cases special types of greases or jelly type of materials are used as fillers. A major problem emerging from the use of these kinds of fillers is that their lubricating properties decrease the friction at the contact surfaces between the individual wires of the cable core. If such lubricating fillers are applied to conventional stranded wire core designs, the individual single wires tend to shift as soon as external forces act on them. In particular conventional stranded conductors, which are built-up from one single wire type (with a specified radius) tend to collapse into more dense hexagonal pattern, where the wires are received in the interstitial grooves formed by the wires of the layer underneath. However such conductors are not round anymore on their outside.

Especially cables subjected to torsion are prone to such shifts of the wires. Beside instability, these changes in the shape of a cable's cross-section may cause unwanted changes in the electrical characteristics of a conductor cable. Furthermore the resulting hexagonal shape of a stranded conductor makes it difficult to coat a cable with a jacket, as in order to receive a circular cable cross-section. This results in a non-constant thickness having the lowest thickness close to the vertices of the hexagonally arranged outermost wires of a strand. Such jackets tend to fail as at the vertices the minimum wall thickness is underrun. Hence, a lot of total material for a jacket is necessary in order to obtain a cable with a certain minimum jacket thickness.

From the prior art, several designs of dimensionally stable stranded wire cores are known, such as Seale, Filler, Warrington and Warrington-Seale. However, these types of stranded wires are all built up from a relatively large number of single wires with differing diameters. Hence production becomes expensive due to stock-keeping of different wire types as well as the preparation of the machinery. In addition many of the filler materials commonly used are relatively expensive and therefore core designs with minimum hollow spaces between the single wires are needed.

The novel concept of the present invention does not only provide a cable core design (architecture) which has a dimensionally stable cross-section, in addition the stable cable core may be built-up by a minimal number of, i.e. only two different types of single wires as well as it is characterized by a low amount of hollow space that has to be sealed. The resulting cable offers a compact design and thereby the amount of filling material is reduced. A further advantage is the simplicity of the method for making a dimensionally stable cable which has results in a positive effect on the expenses for the production.

In contrast to conductors known from the prior art, a method according to the invention offers the advantage to obtain stranded conductors which have a sufficiently circular cross-section by combining a specific number of two different types (groups) of wires. The wires differ primarily in their cross-section.

In a preferred embodiment the first and the second wires are before compacting both having circular cross-sections. The wires of the first type are having a larger diameter (i.e. radius R1) and the wires of the second type are having a smaller diameter (i.e. radius R2). The wires are stranded in one go and then during stranding or thereafter are deformed in a controlled manner. While in a cross-sectional view the wires of the first type are arranged in a hexagonal pattern providing the major part of the geometry six wires of the second type are arranged at the six vertices of the hexagonal pattern of the first wires. It is common that before stranding the six wires of the second type are not filling-in the area of the vertices. This is overcome by a controlled deformation and compacting of the freshly stranded wires.

In a mounted position (i.e. in the stranded cable) when looking at a cross-section the six wires of the second type are arranged at the vertices of the hexagonal packed wires instead of the wires of the first type. The wires of the second type are arranged between at least three wires of the first type and in a final position contact them at three positions along their outer shape. By this contact the wires of the first type are laterally supported in a defined manner and unwanted deformation of the cross-section is prevented.

In the described embodiment, by compacting the outer shape of the wires is deformed in a controlled manner. During the process of compacting it is not the aim to deform the wires in a manner that they fill in the resulting cross-section completely. Instead it is the aim that a certain interstitial space remains available. This space (when looking at the final product) is filled by a sealing agent preventing longitudinal propagation of the liquid and moisture. In one embodiment the interstitial space takes 2% to 20% of the area of the cross-section of the stranded conductor. By compacting the wires of the stranded conductor the diameter of the conductor is reduced.

In order to obtain a dense hexagonal packing pattern, the several layers of wires adjacent to the central layer are all oriented in the same direction (unilay).

In an embodiment six wires in six vertices of a hexagonally shaped second layer are second type wires, which are deformed in radial direction of the cable core by compression before and/or during and/or after the stranding process, such that the gaps to the adjacent first type wires of the same layer are reduced in a defined manner. Simultaneously the total area of the cross-section of the cable core is decreased. The six positions in between said six vertices of the second layer are occupied by first type wires, hence this type of core layout can be identified as 1+6+(6+6). In other words, in a sectional view the wires in this embodiment are essentially positioned like in a dense hexagonal packing of cylinders which is twisted along the axis of the central cylinder, respectively central wire.

Alternatively or in addition the first and/or the second type wires are deformed in prior to the laying (closing) of the wires of the outermost layer, e.g. after being removed from a bobbin and prior to entering a closing die. Alternatively or in addition, the first and second type wires may already be in a deformed shape when being taken from a bobbin. Alternatively or in addition, the first and/or the second type wires are deformed while entering the closing die and/or within the closing die. When being deformed inside of the closing die, a deformation of the other wires may be performed according to the present invention. Alternatively or in addition, the deformation of the first and second type wires may also be performed after the cable core has left the closing die. Hence the deformation of the first and second type wires may be performed in a single step or gradually in multiple steps.

The deformation preferably takes place by passing the wires simultaneously through a stationary or movable die (caliber, jig) where they are controllably deformed. The die may be the single closing die of the stranding machine. Alternatively or in addition one supplementary die or multiple supplementary dies may be positioned between the supply bobbins where wires are taken from and the closing die. If appropriate the wires may be heat treated before and/or during and/or after the deformation process. Alternatively or in addition all or certain wires may deformed by a hot or cold rolling process before and/or after stranding. The deformation by a rolling process or passage through a die may be performed using a lubricant. In one embodiment of the invention, the filler is used as a lubricant.

For a stranded core with e.g. 19 wires, the wires may be unwound from three multiple-wound supply bobbins, onto each of them six wires are wound, and one single-wound supply bobbin. The single-wound supply bobbin may be used as supply for the central wire. One multiple-wound supply bobbin may be used as supply for the six second type wires, whereas the two other multiple-wound bobbins may be used as supply for the six wires of the inner layer and six wires of the outer layer. Thus the size of the whole machinery can be reduced and the risk of wire break can be decreased.

Due to the deformation process according to the invention, the second type wires are shaped such that they at least partially fill-out the space between the first type wires of the outermost layer of wires. Ideally in a sectional view they form three contact zones by which they contact the first type wires—one contact area to the adjacent first type wires of the same layer each and one contact area to the adjacent first type wire of the layer underneath. Thereby they laterally support the adjacent wires, reduce the interstitial space between the wires and prevent unwanted deformation by "locking" the first type of wires in a foreseen position. At the same time the vertices of the hexagonally-shaped outermost layer are chamfered, resulting in an almost circular cross section of the cable core.

In other words, in one embodiment the hexagonal cross-section of a dense packing of circular wires with diameters R1 is approximated to a circular shape by substituting the six wires in the six vertices of the outermost layer of wires by six wires with a smaller diameter R2 that are deformed in radial direction of the resulting stranded conductor.

In a second embodiment of the invention, the stranded core comprises a central wire as well as two layers of wires wound around the core in a dense hexagonal packing, all of them being first type wires. This second embodiment of the invention in addition comprises a third layer of wires helically wound around the second layer of wires. In analogy to the first embodiment of the invention, the third (outermost) layer consists of twelve first type wires, which are as well positioned according to a dense hexagonal packing, and six second type wires which are positioned in the six vertices (corners) of the outermost layer, all second type wires being deformed in radial direction of the resulting stranded conductor.

In order to produce a stranded conductor according to the invention, stranding machines with one closing die or multiple closing dies and one lay plate (wire guide) or multiple lay plates may be used. In one embodiment, the stranded conductor may be made in using one closing die and one lay plate only.

In one embodiment of the invention, the twisting of the stranded conductor may be performed by using a single or multiple twist machine.

In order to fill the interstitial spaces between the wires with a filler material, the assembly and closing of the individual wires may be performed in a closing die which is partly or fully immersed in the filler material. Alternatively or in addition, the wires may be coated to achieve additional functions for special purposes before or after passing a closing die. Alternatively or in addition, the stranded conductor may also be impregnated with the filler material after having left a closing die. In order to enhance the filling process, the stranded conductor and/or the filler may be heated to a specific temperature. After the filling process the stranded conductor may be passed through one or multiple additional dies in order remove surplus filler material from the stranded conductor's peripheral surface. In one embodiment of the invention, filler material may be removed from the conductor's peripheral surface. In another embodiment of the invention, the interstitial grooves on the peripheral surface of the stranded conductor still contain some filler material. In another embodiment of the invention, the filler material is on the peripheral surface is replaced by another filler material, which e.g. may be better suitable for the application of a jacket.

In order to produce a conductor cable, the stranded conductor may be coated with a jacket by at least one extrusion process and/or at least one wrapping process. The jacket may comprise one or multiple layers. Therefore a stranded conductor may be fed directly to an extrusion line (cable extruder) after its production. Alternatively it may first be stored and then be fed to an extrusion line. In one embodiment of the invention, the stranded conductor may be cooled down to a certain temperature after being filled with the filling material and prior to being fed to the extrusion line, in order to increase the filler material's viscosity and hence prevent leakage.

Normally a stranded conductor according to the present invention comprises $$1 + \left(\sum_{i=1}^{n} i - 1\right) \cdot 6$$

wires of the first type and 6 wires of the second type which are arranged at the outer vertices. n is the number of outer layers surrounding the center wire (wherein n>1).

An embodiment of a stranded conductor according to the invention can be described as follows. The stranded conductor comprises a specific number of a first type of wire which, when looking at a cross-section of the stranded conductor, are arranged in a hexagonal pattern around a central wire by at least two layers. Depending on the field of application the first type of wires may themselves have different diameters with respect to two adjacent layers. The wires arranged at the vertices forming the outer geometry of the cross-section of the hexagonal pattern are of a second type of wire having in principle a smaller diameter than the first type of wires. The interstitial spaces between the first and the second wires are filled by a sealing agent as described above. Depending on the design the first and/or the second type of wires may have in the stranded conductor a non-circular cross-section. The non-circular cross-section may result from a deformation process by pulling the conductor through a closing die or a similar tool. The wires of the first and/or the type may have before stranding a circular cross-section. However other shapes, e.g. oval may be appropriate. Good results may be achieved when the interstitial space(s) filled by sealing agent take between 2%-20% of the area of the cross-section. Normally, the wires of the second type are each having in a mounted position having three contact zones by which they may interact with neighboring wires of the first type. The wires of the first type may have in the stranded conductor an in general hexagonal cross-section which results from the controlled deformation according to the herein described invention. If appropriate the wires of the first type of the most outer layer may be substituted by wires of a third type, wherein the wires of the third type are having an in principle larger diameter then the wires of the first type.

In an embodiment the wires of the first type have a diameter in the range 0.05 mm to 3.0 mm. The wires of the second type have a diameter which is in the range of 0.5 to 0.95 times the diameter of the wires of the first type. Good results may be achieved if the wires of the second type have a diameter hich is in the range of 0.82 to 0.9 times the diameter of the wires of the first type. If the wires of the first type of the most outer layer are substituted by wires of a third type, the wires of the third type in the herein discussed embodiment have a diameter which is in the range of 1.02 to 1.2 times the diameter of the wires of the first type. Depending on the field of application other diameters and ratios may be appropriate.

The sealing agent is a grease and/or an oil and/or a plastic material. If required the outer surface is covered by a jacket which comprises at least one layer of an electrically insulating material.

BRIEF DESCRIPTION OF THE DRAWINGS

The herein described invention will be more fully understood from the detailed description of the given herein below and the accompanying drawings, which should not be considered as limiting to the invention described in the appended claims.

DETAILED DESCRIPTION OF THE INVENTION

The foregoing summary, as well as the following detailed description of the preferred embodiments, is better understood when read in conjunction with the appended drawings. For the purposes of illustrating the invention, an embodiment that is presently preferred, in which like numerals represent similar parts throughout the several views of the drawings, it being understood, however, that the invention is not limited to the specific methods and instrumentalities disclosed.

Figure 1:
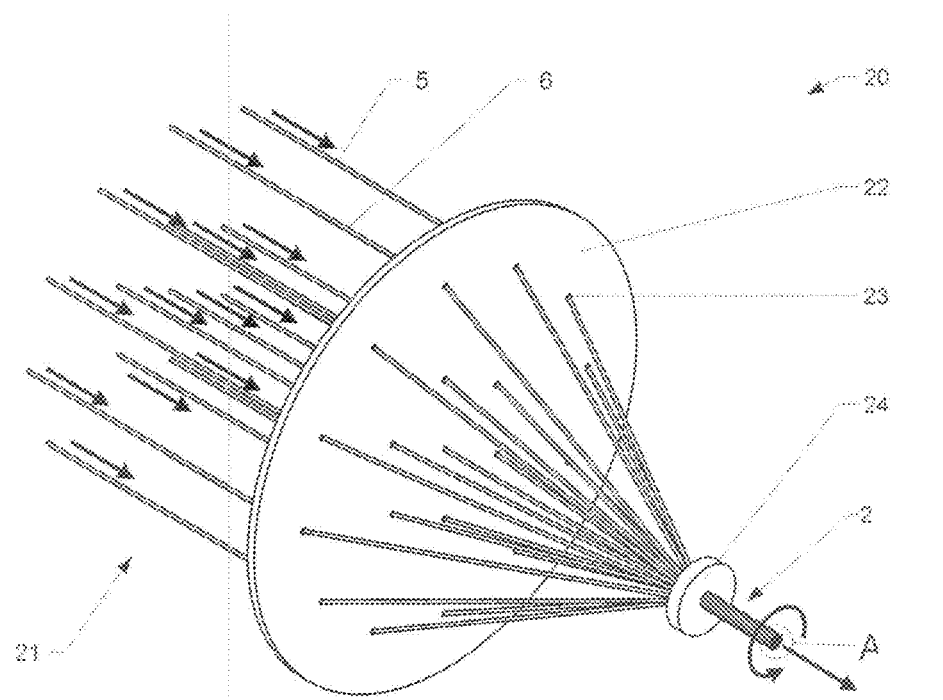
FIG. 1 schematically shows a stranding device in a perspective view.
Figures 2A, 2B:
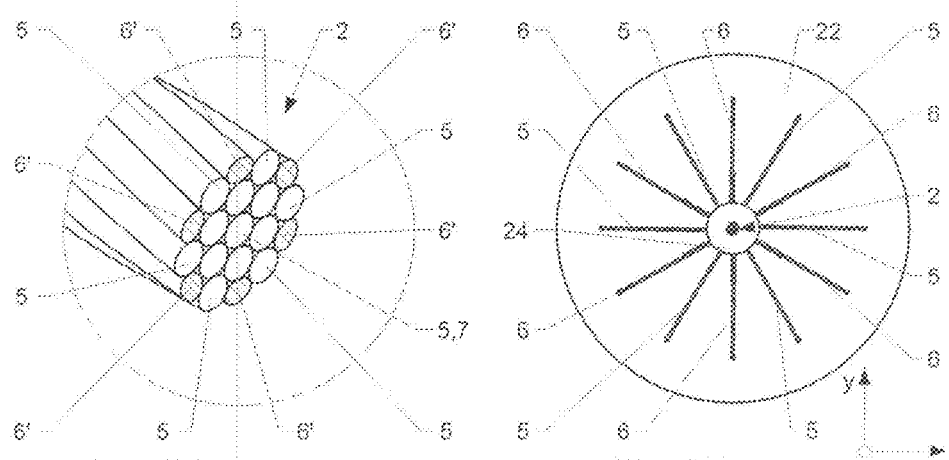
FIG. 2A shows detail A according to FIG. 1.
FIG. 2B schematically shows a stranding device from the front.

FIG. 1 schematically shows a stranding device 20 for the production of a stranded conductor core with 19 wires in a perspective view. FIG. 2A shows detail A of FIG. 1. The stranding device 20 comprises at least one lay plate 22, which guides separated first type wires 5 and second type wires 6 coming from a wire feed 21 through openings 23 to a closing die 24, where they are assembled to a stranded wire. The first 5 and second type wires 6 of the outermost layer are arranged alternately, as can be seen in FIG. 2B. The first type wire 5 has a radius R1 which is higher than the radius R2 of the second type wire 6. The concept used for the alignment of the wires 5, 6 is similar to a closest packed hexagonal lattice of cylinders. As shown in FIG. 2A the central wire and the surrounding first layer of six first wire type wires 5 (wires with non-hatched cross-sections in this Figure), which may be only slightly deformed. In FIGS. 2 to 9, only slightly deformed wires are schematically approximated with circular cross-sections, indicating that they may have a circular cross-section or an only slightly deformed cross-section. The outer (second) layer of wires consists of six first type wires 5 (which may be slightly deformed) and six deformed second type wires 6' (hatched) which are alternately positioned. The first type wires 5 of the second layer are essentially positioned such that each of them is in surface contact with two first type wires 5 of the first layer of wires. The deformed second type wires 6' of the second layer are essentially positioned such that they are in surface contact with only one first type wires 5 of the first layer of wires and with two first type wires 5 of the outermost layer.

Figure 3:
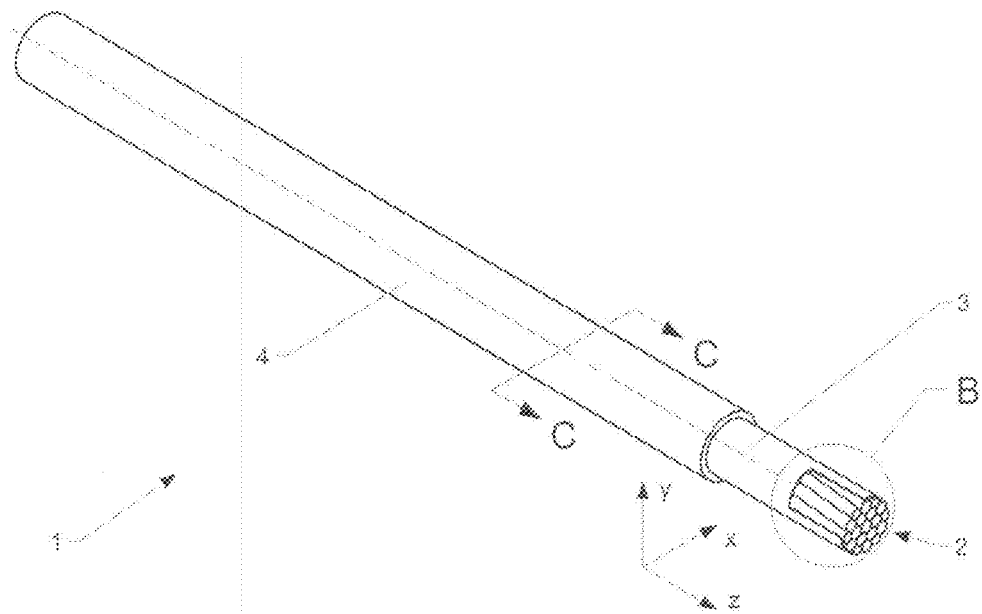
FIG. 3 schematically shows an embodiment of a cable in a perspective view. The jacket and the filler are partially removed at one end of the cable in order to display the filler and the stranded conductor core.
Figure 4:
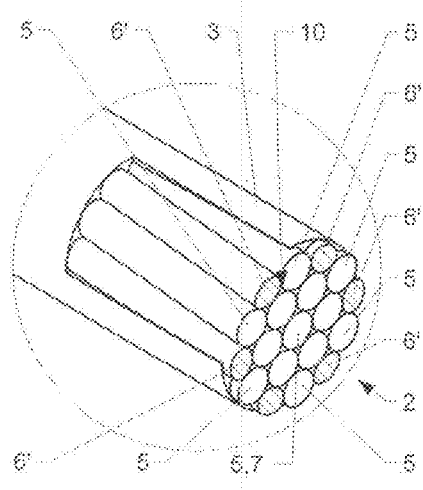
FIG. 4 shows detail B according to FIG. 3.
Figure 5:
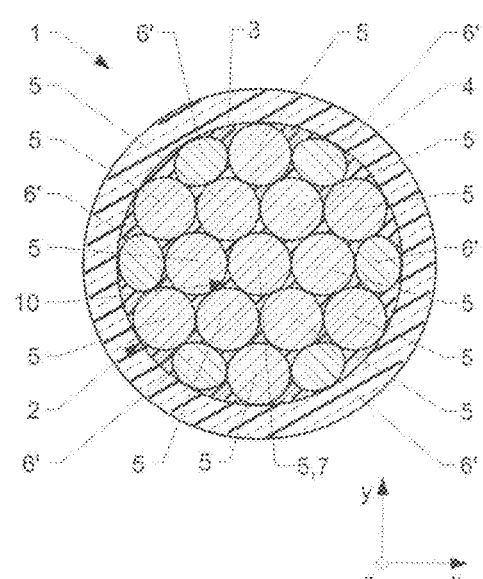
FIG. 5 shows a section view C of the cable according to FIG. 3.

FIG. 3 shows a conductor cable 1 with a stranded core 2, a filler 3 and a jacket 4. The jacket 4 as well as the filler 3 were partially removed in order to make the inner structure of the cable visible. The stranded core has an essentially circular cross-section and is built up from a total of 19 single wires, as can be seen in FIG. 5. FIG. 4 shows detail B according to FIG. 3 and illustrates that the filler may not only fill the otherwise hollow interstitial spaces 10 (commonly also called gussets or interstitials) inside the stranded core 2 in between the single wires, but may also at least partially cover the outer surface of the stranded core 2. The jacket may comprise one or multiple concentric layers. FIG. 5 shows cross-section C according to FIG. 3 and illustrates a possible embodiment of a stranded core 2 as well as a possible conductor cable 1 according to the invention. The stranded core 2 comprises a center wire 7 which is first type wire 5 with radius R1 that may be slightly deformed. This center wire 7 is surrounded by a first essentially hexagonally shaped layer of six first type wires 5 helically wound around the center wire 7, which may be slightly deformed. Adjacent and concentric to this first layer of wires there is a second essentially hexagonally shaped layer of wires. The six wires at the six corner positions (vertices) of the second hexagonally shaped layer are deformed second type wires 6', whereas the six wires in between the corner positions (vertices) are first type wires 5, which may be slightly deformed as well. Hence the layout of the stranded core 2 is 1+6+(6+6). As can be seen in FIG. 5, all interstitial spaces 10 in between the wires are filled with the filler 3, which may be a grease and/or an oil and/or a jelly and/or a plastic.

Figure 6:
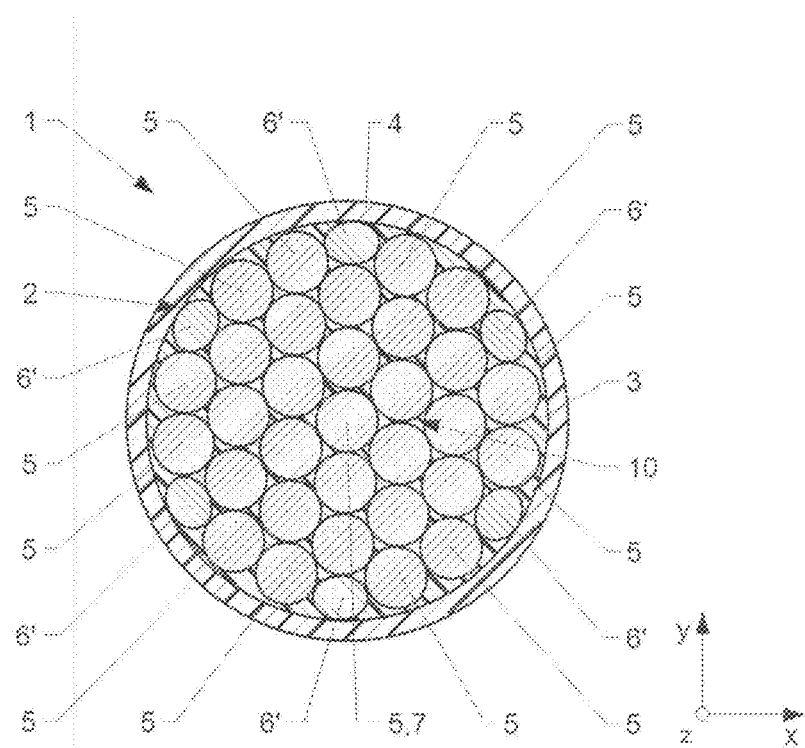
FIG. 6 shows a section view of an embodiment of a cable.

FIG. 6 shows another embodiment of a conducting cable that comprises a stranded core 2, a filler 3 and a jacket 4. It may also comprise a filler 3 located in the interstitials 10 in between the single wires of the stranded core 2 and in between the stranded core and the jacket 2. The stranded core 2 comprises a center wire 7 and two concentric and essentially hexagonally shaped layers of wires wound around the center wire 7, all of them being first type wires 5, which may be slightly deformed. In analogy to the embodiment with two layers described before, the wires in the vertices of the outermost (third) hexagonal layer are crimped second type wires 6', whereas all other wires of the third hexagonal layer are first type wires 5, leading to a 1+6+12+(12+6) layout.

Figure 7:
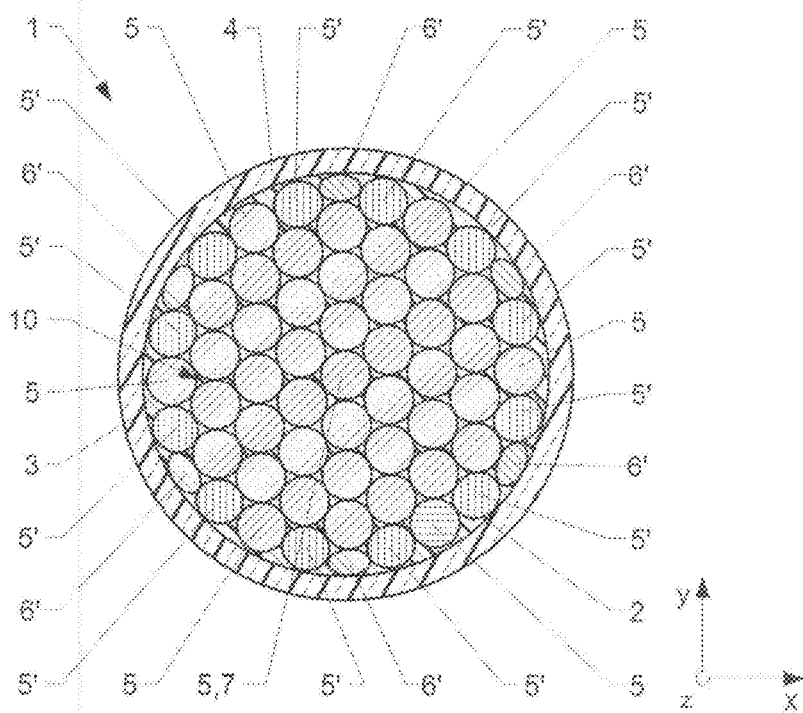
FIG. 7 shows a section view of an embodiment of a cable.

FIG. 7 shows a third embodiment of the invention with four concentric essentially hexagonal layers of wires, with the layout 1+6+12+18+(18+6). As in the embodiments described before, the six vertices of the outermost layer are occupied by deformed second type wires 6'. In addition, the twelve first type wires 5' in the outermost layer which are adjacent to the six second type wires 6' may be significantly deformed by applying a partial fattening or a crimp process. Thus the approximation of the stranded core's cross-section to a circular shape can be improved. Such partial deformation processes of the first type wires 6 may be performed before the wires enter a closing die and/or while entering a closing die and/or while being inside a closing die and/or when leaving a closing die and/or after having left a closing die.

Figure 8:
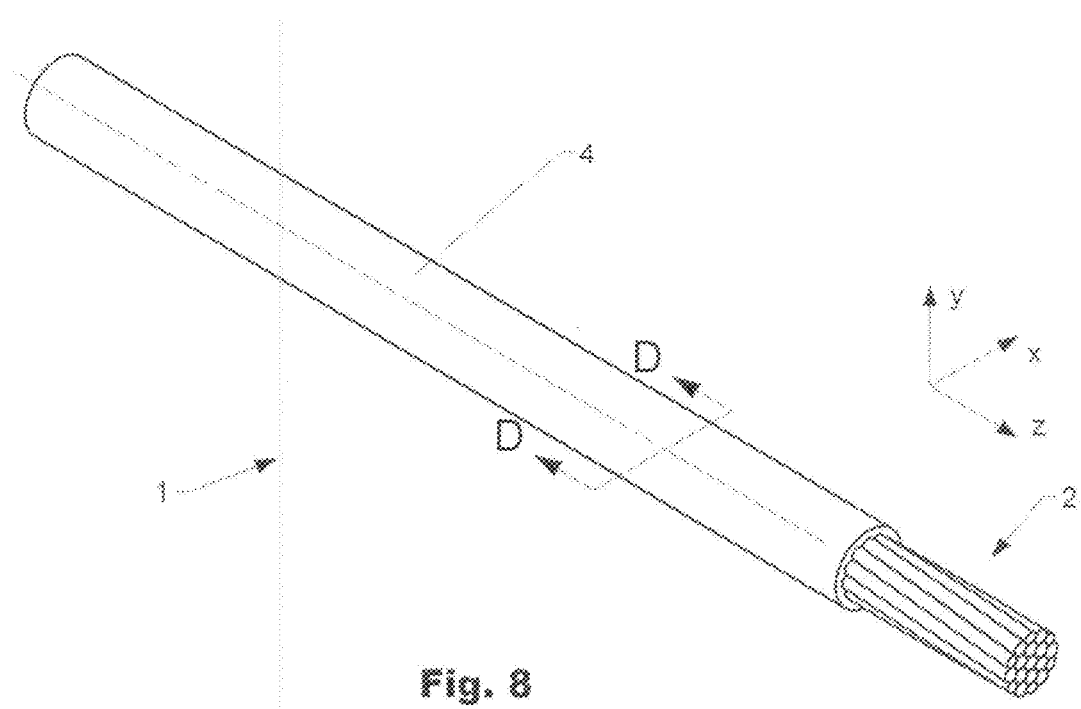
FIG. 8 schematically shows an embodiment of a cable in a perspective view. Part of the cable jacket was removed in order to display the stranded conductor core.
Figure 9:
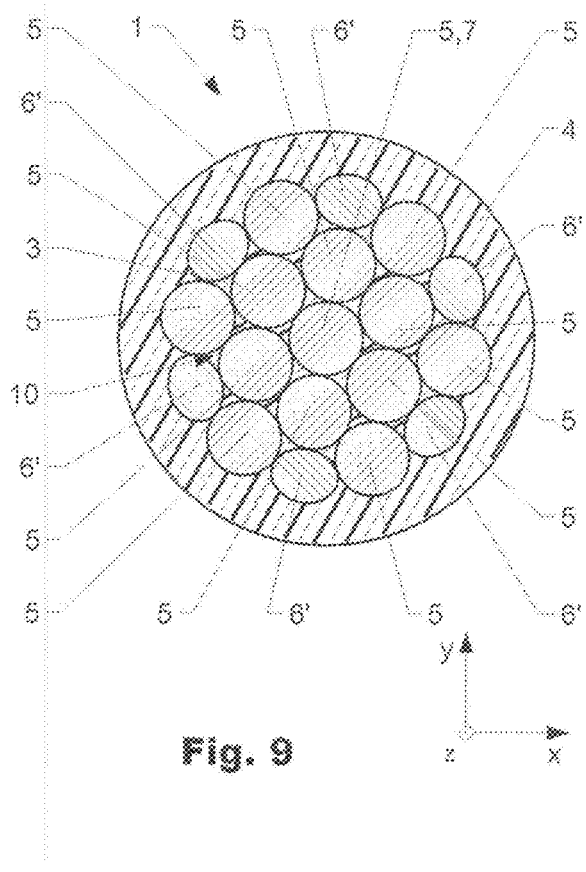
FIG. 9 shows a section view D of the cable according to FIG. 8.

FIG. 8 shows another embodiment of a conductor cable where the filler 3 is limited to the interstitial spaces (gussets) in between the single wires only. As can be seen in the cross-section D shown in FIG. 9, the jacket 4 is essentially in direct contact with the whole peripheral surface of the stranded conductor, including the interstitial grooves. According to the invention this type of jacket may be applied for all types/embodiments of stranded cores as described before.

Figure 10:
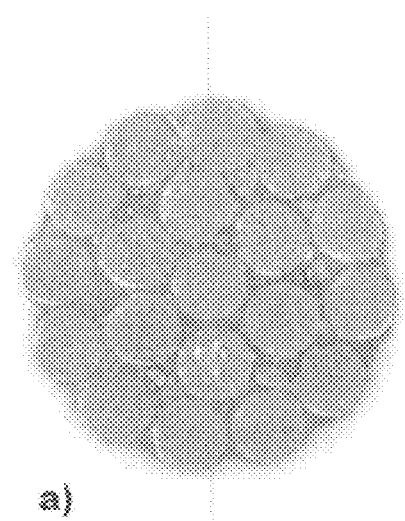
FIG. 10 (a) shows a sectional image of a conventional stranded conductor and (b) the outline of the sectional image.
Figure 10:
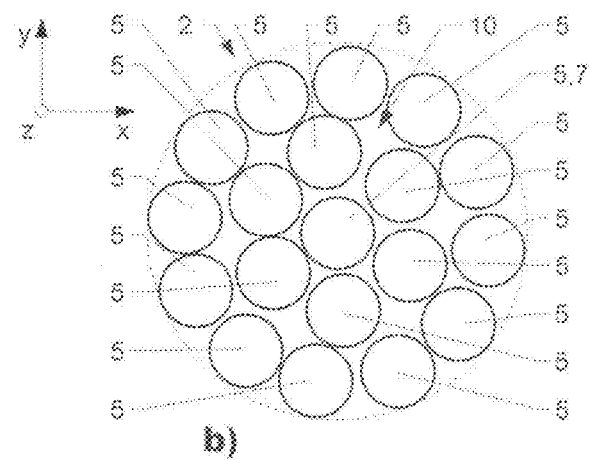

FIG. 10 shows a prior art strand of 19 wires including a central wire 7, six wires of a first (inner) layer and twelve wires of a second (outer) layer, which are twisted around the central wire 7 in a non-hexagonal fashion, leading to an essentially circular cross-section. As can be seen in the micrograph image (a) as well as outline (b), the interstitial spaces 10 in between the wires are relatively big.

Figure 11:
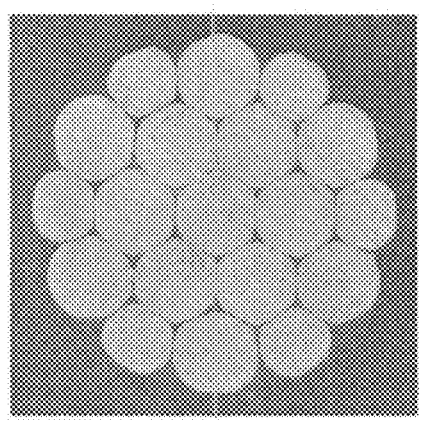
FIG. 11 (a) shows a sectional image of a stranded conductor according to the invention and (b) the outline of the sectional image.
Figure 11:
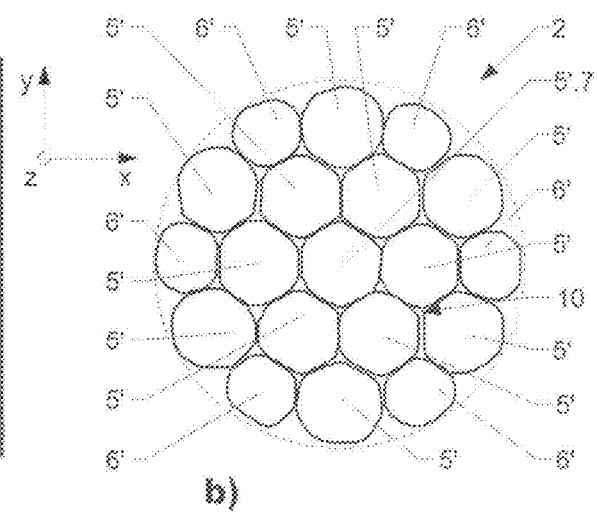

FIG. 11 shows a strand made out of 19 wires according to the invention, where the filling material is not visible. The strand comprises only two different types of wires, which makes the manufacturing significantly easier than when using three different types of wires. The central wire 5', 7 and other wires 5' except for those 6' in the six vertices of the hexagonal second layer are made out of deformed first type wire, which had been deformed by radial compression.

The whole strand has been compressed in radial direction, leading to deformations of the individual wires' cross-sections. The wires of this type of stranded conductor are aligned in a stable manner. As well, as can e.g. be seen in outline (b), this type of strand comprises dense packing with relatively low total interstitial space 10.

Figure 12:
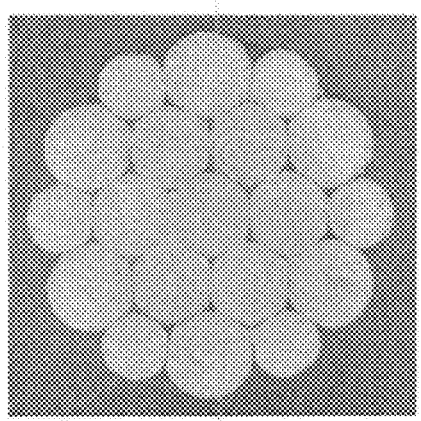
FIG. 12 (a) shows a sectional image of a stranded conductor according to the invention and (b) the outline of the sectional image.
Figure 12:
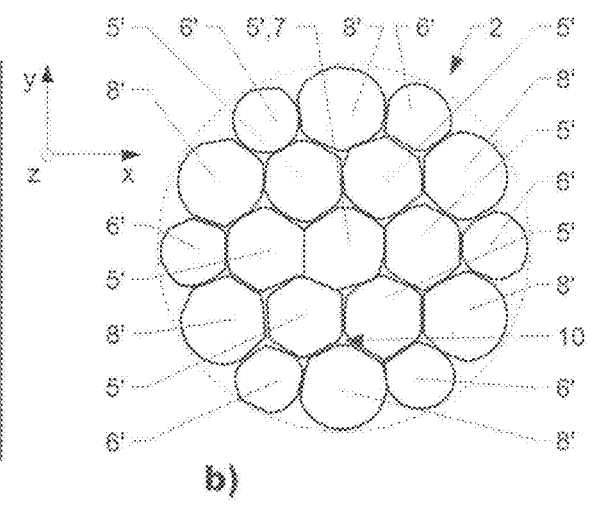

FIG. 12 (*a*) shows another stranded conductor according to the invention. The strand is made out of 19 wires, including a central wire 7 and six wires 5' with the same diameter as the central wire 7 in a first layer. Furthermore the stranded conductor comprises a second (outermost) layer that comprises six wires 6' with a diameter smaller than the diameter of the central wire 7, and six deformed wires 8' of a third wire type with a diameter bigger than the diameter of the central wire 7. The whole strand has been compressed in radial direction, leading to deformations of the individual wires' cross-sections. The wires of this type of stranded conductor are aligned in a stable manner. Also, as can be seen in outline (b), this type of strand comprises dense packing with relatively low total interstitial space 10.

What is claimed is:

1. A stranded conduct (2) comprising:
   a. a specific number of a first type of wire (5) which, in cross-section of the stranded conductor, are arranged in a hexagonal pattern around a central wire in at least two layers,
   b. whereby the wires arranged at vertices of the most outer layer of the hexagonal pattern are of a second type of wire (6) having a smaller diameter than the first type of wires;
   c. and wherein interstitial spaces (10) between the first and the second wires are filled by a sealing agent (3);
   d. wherein the first (5) and the second (6) type of wires in the stranded conductor (2) include a non-circular cross-section.

2. The stranded conductor (2) according to claim 1, wherein the non-circular cross-section results from deformation process by pulling the conductor through a closing die(24).

3. The stranded conductor (2) according to claim 1, wherein the wires of the first type (5) include a circular cross-section before stranding.

4. The stranded conductor (2) according to claim 1, wherein the wires of the second type (6) include a circular cross-section before stranding.

5. The stranded conductor (2) according to claim 1, wherein the interstitial space (10) takes between 2%-20% of the area of the cross-section.

6. The stranded conductor (2) according to claim 1, wherein the wires of the second type (6, 6') each include three contact zones by which they interact with neighboring wires of the first type (5, 5').

7. The stranded conductor (2) according to claim 1, wherein the wires of the first type (5') in the stranded conductor include a general hexagonal cross-section.

8. The stranded conductor according to claim 1, wherein the wires of the first type (5, 5') of the outer layer are substituted by wires of a third type (8'), wherein the wires of the third type (8') include a larger diameter then the wires of the first type (5, 5').

9. The stranded conductor (2) according to claim 8, wherein the wires of the third type (8') have a diameter which is in the range of 1.02 and 1.2 times the diameter of the wires of the first type (5).

10. The stranded conductor (2) according to claim 1, wherein the wires of the first type (5) have a diameter in the range 0.05 mm and 3.0 mm.

11. The stranded conductor (2) according to claim 1, wherein the wires of the second type (6) have a diameter which is in the range of 0.5 and 0.95 times the diameter of the wires of the first type (5).

12. The stranded conductor (2) according to claim 1, wherein the scaling agent (3) is a grease and/or an oil and/or a plastic material.

13. The stranded conductor (2) according to claim 1, wherein an outer surface of the stranded conductor (2) is covered by a jacket (4) which comprises at least one layer of an electrically insulating material.

14. The stranded conductor (2) according to claim 1 comprising a total of 19 or 37 or 61 wires (5, 5', 6, 6').

15. The stranded conductor (2) according to claim 1, wherein the first and/or the second type of wires (5, 5', 6, 6') are selected from a group of the following materials: Aluminum, aluminum alloy, copper, copper alloy.

16. The stranded conductor (2) according to claim 1, wherein the wires of the second type (6) are made out of a material which has a different Young's modulus that the material the wires of the first type (5) are made from.

17. The stranded conductor (2) according to claim 16, wherein the Young's modulus of the wires of the second type (6) is lower than the Young's modulus of the wires of the first type (5).

* * * * *